United States Patent
Cornaglia

(10) Patent No.: US 10,358,967 B2
(45) Date of Patent: Jul. 23, 2019

(54) EXHAUST GAS REDUCTION UNIT FOR INTERNAL COMBUSTION ENGINE

(71) Applicant: OFFICINE METALLURGICHE G. CORNAGLIA S.P.A., Beinasco (IT)

(72) Inventor: Pier Mario Cornaglia, Moncalieri (IT)

(73) Assignee: OFFICINE METALLURGICHE G. CORNAGLIA S.P.A., Beinasco (TO) (IT)

( * ) Notice: Subject to any disclaimer, the term of this patent is extended or adjusted under 35 U.S.C. 154(b) by 84 days.

(21) Appl. No.: 15/513,198

(22) PCT Filed: Sep. 22, 2015

(86) PCT No.: PCT/IB2015/057284
§ 371 (c)(1),
(2) Date: Mar. 22, 2017

(87) PCT Pub. No.: WO2016/046737
PCT Pub. Date: Mar. 31, 2016

(65) Prior Publication Data
US 2017/0241319 A1    Aug. 24, 2017

(30) Foreign Application Priority Data

Sep. 23, 2014 (IT) .............................. TO2014A0749

(51) Int. Cl.
*F01N 3/28* (2006.01)
*B01D 53/94* (2006.01)
(Continued)

(52) U.S. Cl.
CPC ........... *F01N 3/2892* (2013.01); *B01D 53/94* (2013.01); *B01F 3/04049* (2013.01);
(Continued)

(58) Field of Classification Search
CPC .. F01N 3/2892; F01N 3/2066; F01N 2240/20; F01N 2260/06; F01N 2260/18;
(Continued)

(56) References Cited

U.S. PATENT DOCUMENTS 8,079,211 B2    12/2011 Levin et al.
2010/0107614 A1    5/2010 Levin et al.
(Continued)

FOREIGN PATENT DOCUMENTS

FR            1227690 A  *  4/1966  ............... F01N 1/12

*Primary Examiner* — Laert Dounis
*Assistant Examiner* — Kelsey L Stanek
(74) *Attorney, Agent, or Firm* — Howson & Howson LLP

(57) ABSTRACT

Unit for reduction of exhaust gases for an IC engine. The unit has a cylindrical housing with gas inlet and outlet openings and injector for a reducing substance. A helicoid is coaxially arranged inside the housing. A channel conveys the exhaust gases, has a substantially quadrangular cross-section, and helicoidally develops inside the unit. The helix is generated by the intersection between the inner surface of the housing and the helicoid has an inclination angle ($\beta$) relative to planes perpendicular to the generatrices of the cylindrical housing ranging from 0° to 30°. The unit includes a coaxial stiffening and stabilization sleeve located at the center of the helicoid passing axially throughout the helicoid and axially over a length at least equal to the axial length of the helicoid. The sleeve cooperates with the inner surface of the housing and with the opposite surfaces of the helicoid to define the helicoidal channel.

10 Claims, 2 Drawing Sheets

Fig.4

(51) Int. Cl.
*B01F 5/06* (2006.01)
*F01N 3/20* (2006.01)
*B01F 3/04* (2006.01)

(52) U.S. Cl.
CPC .......... *B01F 5/0614* (2013.01); *B01F 5/0647* (2013.01); *F01N 3/2066* (2013.01); *B01F 2005/0637* (2013.01); *B01F 2215/0036* (2013.01); *F01N 2240/20* (2013.01); *F01N 2260/06* (2013.01); *F01N 2260/18* (2013.01); *F01N 2410/10* (2013.01); *F01N 2470/08* (2013.01); *F01N 2610/02* (2013.01); *F01N 2610/1453* (2013.01); *Y02A 50/2325* (2018.01); *Y02T 10/24* (2013.01)

(58) Field of Classification Search
CPC ............. F01N 2410/10; F01N 2470/08; F01N 2610/02; F01N 2610/1453; B01D 53/94; B01F 3/04049; B01F 5/0614; B01F 5/0647; B01F 2005/0637; B01F 2215/0036; Y02T 10/24
USPC .......................................... 60/285, 286, 295
See application file for complete search history.

(56) References Cited

U.S. PATENT DOCUMENTS

| | | | | |
|---|---|---|---|---|
| 2013/0216442 A1* | 8/2013 | Brunel | ................ | B01F 3/04049 422/172 |
| 2013/0239546 A1* | 9/2013 | Levin | ................... | B01F 5/0268 60/274 |
| 2015/0211398 A1* | 7/2015 | Hornback | ............. | F01N 3/2066 422/168 |

* cited by examiner

EXHAUST GAS REDUCTION UNIT FOR INTERNAL COMBUSTION ENGINE

TECHNICAL FIELD

The invention relates to a unit for the reduction of exhaust gases for an IC engine. More particularly, the invention relates to a reduction unit that can be incorporated in a system for the selective catalytic reduction (SCR) of nitrogen oxides.

PRIOR ART

IC engines are increasingly equipped with an exhaust system capable of abatement of noxious emissions in the atmosphere. Nitrogen oxides are among the noxious emissions that are desired to be abated. Some systems for controlling emissions provided on vehicles with IC engines comprise an injector for the reducing substance, usually urea or ammonia, arranged in the exhaust duct, upstream of a catalyst unit. The purpose of the reducing substance is to reduce nitrogen oxides to biatomic nitrogen, water and other less noxious substances before gases are released to the atmosphere.

In order to promote the process of reducing nitrogen oxides, uniform diffusion of the reducing substance inside the exhaust duct is required. To this aim, some solutions are known in the art. For example, mixing devices are known that are arranged in the exhaust duct, downstream of the reducing substance injector and upstream of the catalyst. The mixer has mainly the purpose of promoting formation of a highly homogeneous mixture and to make the reducing substance introduced in the exhaust system evaporate as much as possible. Such mixing devices usually comprise a plurality of vanes intercepting the gas flow and generating a turbulent motion. The vanes define corresponding impact surfaces for the gases and the reducing substance. The surfaces of the vanes may be oriented in different ways relative to the exhaust gas flow and relative to the reducing substance jet coming from the injector. US 2010/0107614 describes an example of mixing unit in which a bladed mixer and a helicoidal mixer are provided. The helicoidal configuration of the mixer is employed for forcing exhaust gases and reducing substance droplets to follow a longer path inside the reduction unit. A longer path has the purpose of increasing the evaporation time of the reducing substance, thus improving mixing of said liquid with the exhaust gases. As the path for the gases develops in a spiral-like manner, the reduction unit has a small size.

The helicoidal mixer, however, is of hindrance inside the exhaust duct and causes an undesired pressure drop downstream of the mixer. The pressure drop varies mainly according to the inclination between the surface of the helicoidal mixer and the planes perpendicular to the generatices of the cylindrical duct in which the mixer is housed. The smaller this inclination is, the bigger the obstruction to the passage of gases and consequently the pressure drop in the duct are. A surface that is slightly inclined relative to the direction of the gas flow further increases the component of the force with which the gases hit said surface. The increase in said force causes vibrations in the material of the mixer and induces increased bending moments that will be higher at the periphery of the mixer due to the higher lever arm. Such phenomena are undesired both because they worsen the performance of the mixer and because they jeopardize its service life. In addition, these phenomena increase the noise level of the mixer. A first object of the invention is therefore to solve the problem of how to obtain a mixer with a very long path for the exhaust gases, thus avoiding these undesired phenomena.

A second object of the invention is to obtain the aforementioned effects, due to the longer path for the exhaust gases, with less pressure drop than in prior art solutions.

Another object of the invention is to provide a unit of the aforementioned kind that is easy and cost-effective to manufacture.

A further object of the invention is to provide a unit for the reduction of exhaust gases for an IC engine that can be incorporated in a system with selective catalytic reduction (SCR) of nitrogen oxides.

A not least object of the invention is to provide a reduction unit that can be manufactured industrially in a cost-effective manner.

The aforementioned objects are achieved by the unit for the reduction of exhaust gases in an IC engine according to the appended claims.

SUMMARY OF THE INVENTION

The unit for the reduction of exhaust gases in an IC engine according to the invention comprises a substantially cylindrical housing. The housing has an inlet opening and an outlet opening allowing the exhaust gases to enter and exit the reduction unit, respectively. The reduction unit is configured at its inside in such a way that all the exhaust gas entering through the inlet opening exits from the outlet opening. The reduction unit further comprises an injector for a reducing substance. According to the invention, the reduction unit is configured in such a way that at least part of the gas flow entering through the inlet opening travels a distance longer the axial length of the housing before exiting through the outlet opening. To this aim, according to the invention, a coaxial helicoid is provided inside the housing. According to the invention the helicoid can be leftward or rightward with respect to the exhaust gas flow.

Advantageously, according to the invention, the reduction unit further comprises a sleeve for stiffening and stabilizing the sleeve. The sleeve is arranged coaxial to the center of the helicoid and passes axially throughout the helicoid. Thanks to the sleeve the helicoid is therefore free from the vibrations and deformations caused by the passage of exhaust gases and by the shock waves of the gases against the surface of the helicoid. Preferably, for obtaining the desired stiffening and stabilization, the diameter of the sleeve is at least one fifth of the diameter of the helicoid. Said diameters are further preferably constant along their respective longitudinal axes. In addition, for the same reasons, in a particular embodiment of the invention, the sleeve extends on one side, or even more preferably on both sides, beyond the axial length of the helicoid, over a length at least equal to the pitch of the helicoid.

Inside the unit, a channel for conveying the exhaust gases is consequently defined by the inner surface of the housing, by the outer surface of the sleeve and by the opposite surfaces of the helicoid. The channel has a helicoidal development inside the unit and extends preferably uninterruptedly. The channel further has a substantially quadrangular cross-section, preferably a square cross-section or a rectangular cross-section, the minor side of which has the same length as the pitch of the helicoid. Advantageously, according to the invention, the helix generated by the intersection between the inner surface of the housing and the helicoid has an angle of inclination relative to the planes perpendicular to the generatrices of the cylindrical housing preferably comprised between 0° and 30°, and more preferably lower than 20°.

According to a preferred embodiment of the invention, the sleeve is closed to the passage of gases. In another embodiment, the sleeve is open to the passage of gases and defines a corresponding by-pass conduit with respect to the helicoidal channel.

In a particular embodiment of the invention, the surface of the helicoid comprises at least one hole for the passage of gases through the surface of the helicoid. According to another embodiment, the surface of the helicoid comprises a plurality of randomly distributed holes. In still another embodiment, the surface of the helicoid is perforated and substantially defines a grid. Preferably, the surface of the helicoid is also corrugated.

BRIEF DESCRIPTION OF THE DRAWINGS

Some preferred embodiments of the invention will be described by way of non-limiting example with reference to the accompanying drawings, in which same or functionally equivalent parts are designated with the same reference numerals.

DESCRIPTION OF PREFERRED EMBODIMENTS

Figure 1:
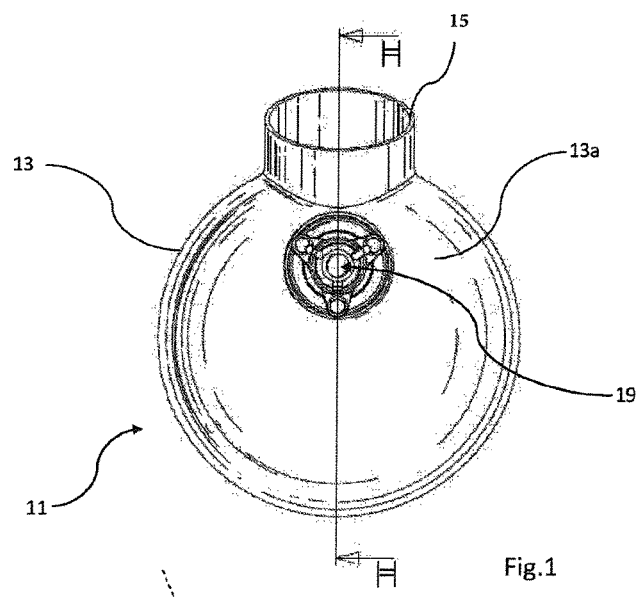
FIG. 1 is a plan view of the upstream side of the reduction unit in a first embodiment of the invention.
Figure 2:
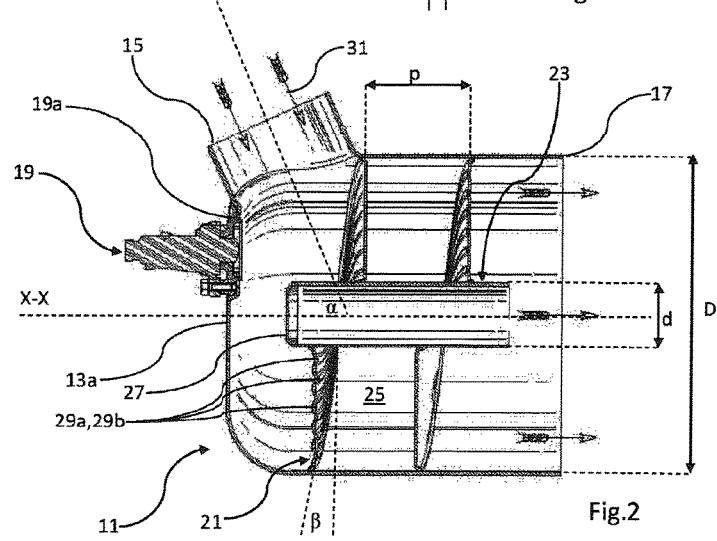
FIG. 2 is a sectional view along the line II-II of FIG. 1.

Referring to FIGS. 1 and 2, there is illustrated a first embodiment of the unit for the reduction of exhaust gases for an IC engine according to the invention. The unit is identified as a whole with reference numeral 11 and comprises a substantially cylindrical housing 13. In the shown example, the housing 13 is circular in plan, however other shapes such as an oval or quadrangular shape may be provided for the cross-section of the housing 13. The housing 13 has an inlet opening 15 and an outlet opening 17 for the exhaust gases. According to the illustrated embodiment, the inlet opening 15 is oriented approximately radially with respect to the axis X-X of the cylindrical housing 13. More particularly, the inlet opening 15 is oriented in an oblique direction at an angle α comprised between about 0 and 90° relative to the axis X-X of the cylindrical housing 13. The unit 11 further comprises and injector 19 for injecting a reducing substance into the unit 11. In the illustrated embodiment, the injector 19 is arranged axially and off-centered relative to the axis of the cylindrical housing 13. Said housing 13 further comprises a dome-shaped portion 13a which axially closes one of the bases of the housing 13. The inlet opening 15 is preferably provided, as in the shown example, in said dome 13a. The injector 19, too, is preferably attached to the unit 11 at the dome 13a, in a hole 19a provided for this purpose.

According to the invention, a helicoid 21 is arranged inside the housing 13. The helicoid 21 is coaxially arranged inside the housing and defines a channel 25 for conveying the exhaust gases. The channel 25 has a preferably quadrangular, substantially square or rectangular, cross-section, with a radial extension smaller than the axial one. Preferably, the pitch "p" of the helicoid 21 is constant. In addition, each generatrix of the housing 13 is tangent to the helicoid 21 in at least two points. The helix generated by the intersection between the inner surface of the housing 13 and the helicoid 21 has an inclination angle β with respect to the planes perpendicular to the generatrices of the cylindrical housing preferably ranging from 0° to 30°. Even more preferably, said angle β is smaller than 20°. According to the invention, there is provided a sleeve 23 coaxial to the center of the helicoid 21. The sleeve passes axially throughout the helicoid. The housing 13, the helicoid 21 and the sleeve 23 are preferably coaxial to the axis X-X.

The sleeve 23 has a function of stiffening and stabilization of the helicoid 21 inside the housing 13 and cooperates with the inner surface of the housing 13 and with the opposite surfaces of the helicoid 21 in order to define said channel 25 with helicoidal development.

According to the invention, the diameter "d" of the sleeve 23 is preferably at least one fifth of the diameter "D" of the helicoid 21. According to a variant of embodiment of the invention, the sleeve 23 has a length greater than the axial development of the helicoid and said sleeve 23 extends on one side, or even more preferably on both sides, with respect to the axial length of the helicoid 21, over a length at least equal to the pitch "p" of the helicoid 21.

Figure 3:
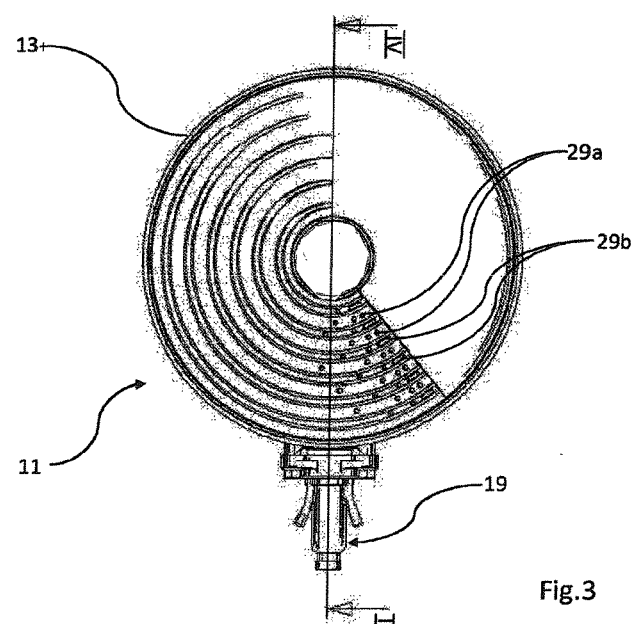
FIG. 3 is a plan view of the upstream side of the reduction unit in a second embodiment of the invention.
Figure 4:
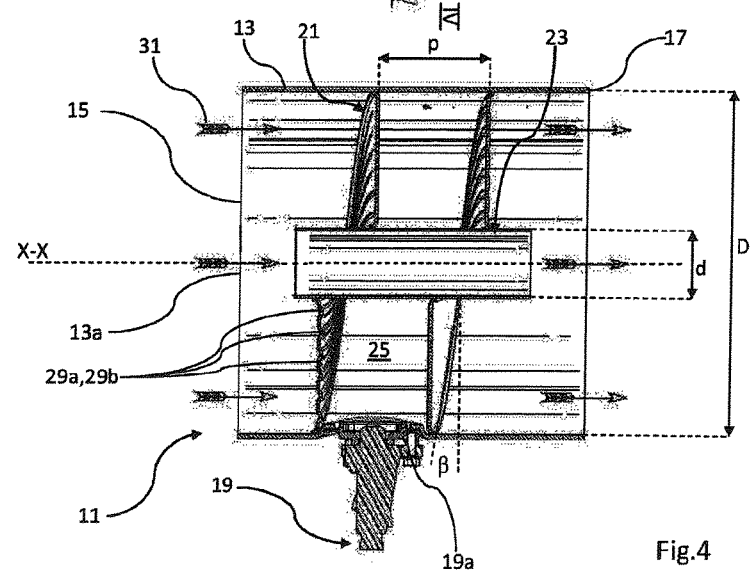
FIG. 4 is a sectional view along the line IV-IV of FIG. 3.

Preferably, the sleeve 23 is hollow and closed at its upstream end by a plug 27, such as shown in FIG. 2. Alternatively, the sleeve 23 is hollow and open at its both ends, such as shown in FIGS. 3 and 4, and defines an axial by-pass conduit with respect to the helicoidal channel 25. Preferably, the area of the cross-section of the by-pass conduit is approximately ½₅ of the area of the cross-section of the helicoidally developing channel 25.

According to the invention, the surface of the helicoid 21 has one or both of its faces preferably corrugated, in order to promote passage of the gases and stiffen the structure of the helicoid 21.

Still according to the invention, the surface of the helicoid 21, which may be smooth or corrugated, preferably comprises at least one hole 29a,29b and more preferably a plurality of holes 29a,29b. The section of the holes 29a,29b can have various shapes, preferably a circular shape, holes numbered 29a, or a rectangular shape, holes numbered 29b. In the illustrated embodiment, both circular holes 29a and rectangular holes 29b are provided. Said holes are advantageously distributed according to a predetermined pattern in order to obtain the desired effects of reducing the pressure drop in the unit 11. Alternatively, the surface of the helicoid 21 may comprise a grid. The holes 29a,29b or the grid advantageously allow(s) passage of the exhaust gases in axial direction through the helicoid 21, thus reducing the pressure drop caused by the presence of the helicoidal channel 25.

The housing 13, the helicoid 21 and the sleeve 23 are preferably made of metal, preferably of steel sheet or aluminium sheet and joined together by welding along the helices generated by the intersection between the helicoid 21 and the generatrices of the sleeve 23 and the housing 13, respectively.

Referring to FIGS. 3 and 4, there is illustrated a second embodiment of the reduction unit 11 according to the invention, which differs from the first embodiment mainly in the arrangement of the gas inlet opening 15. This second arrangement further differs in the arrangement of the injector 19. As is particularly visible in FIG. 3, the inlet opening 15 for the exhaust gases is coaxial to the axis X-X of the cylindrical housing 13, of the helicoid 21 and of the sleeve 23. This embodiment is particularly suitable for the making of those reduction units 11 which are to be incorporated in exhaust systems requiring a large surface of communication with the reduction unit.

In this embodiment of the invention, the injector 19 is arranged radially and protrudes through the housing 13 into the helicoidal channel 25, i.e. between the surfaces of the helicoid 21. This radial arrangement of the injector 19 is further compatible also with the first embodiment. Advantageously, the arrangement of the injector 19 in the channel 25, preferably not beyond half of the length of said channel 25, allows to obtain a more effective mixing action of the reducing substance with the exhaust gases by virtue of the helicoidal motion of the gases themselves. Still according to this second embodiment of the invention, it is also possible to provide the injector 19 arranged axially inside the housing 13, upstream of the helicoid 21, in the area of the housing 13 preceding said helicoid 21 in the direction of passage of the exhaust gases indicated by the arrows 31. This configuration may for instance be obtained by means of a portion of said housing 13 radially protruding inward of the housing.

The unit as described and illustrated may be subjected to several modifications falling within the same inventive principle.

The invention claimed is:

1. A unit for the reduction of exhaust gases for an IC engine, comprising:
   a cylindrical housing having a gas inlet opening, a gas outlet opening and an injector for a reducing substance;
   a helicoid coaxially arranged inside the cylindrical housing;
   a sleeve coaxial to the helicoid for stiffening and stabilizing the helicoid, said sleeve being located at a center of the helicoid and passing axially throughout the helicoid and axially extending for a length at least equal to an axial length of the helicoid; and
   a channel aimed at conveying the exhaust gases, said channel helicoidally developing inside the unit;
   wherein a helix generated by an intersection between an inner surface of the cylindrical housing and the helicoid has an inclination angle ($\beta$) relative to planes perpendicular to generatrices of the cylindrical housing ranging from 0° to 30°;
   wherein said sleeve cooperates with the inner surface of the housing and with surfaces of the helicoid to define the helicoidal channel for conveying the exhaust gases; and
   wherein said sleeve is open at both ends and defines a by-pass conduit with respect to the helicoidal channel.

2. The unit according to claim 1, wherein said inclination angle ($\beta$) is less than 20°.

3. The unit according to claim 1, wherein the surfaces of the helicoid include at least one hole.

4. The unit according to claim 1, wherein the surfaces of the helicoid include a plurality of holes.

5. The unit according claim 1, wherein the helicoid has corrugated surfaces.

6. The unit according to claim 1, wherein the injector is radially arranged in the cylindrical housing and opens into the helicoidally developing channel.

7. The unit according to claim 1, wherein an area of a cross-section of the by-pass conduit is approximately 1/25 of an area of a transverse surface of the helicoidally developing channel.

8. The unit according to claim 1, wherein a diameter (d) of the sleeve is at least one fifth of a diameter (D) of the helicoid.

9. The unit according to claim 1, wherein the sleeve extends on both sides with respect to the axial length of the helicoid over a length at least equal to a pitch of the helicoid.

10. The unit according to claim 1, wherein the helicoidal channel has a quadrangular cross-section.

\* \* \* \* \*